United States Patent [19]

Nagano

[11] Patent Number: 4,840,081

[45] Date of Patent: Jun. 20, 1989

[54] SPEED-CHANGE OPERATING LEVER FOR A BICYCLE

[75] Inventor: Masashi Nagano, Izumi, Japan

[73] Assignee: Shimano Industrial Company Limited, Osaka, Japan

[21] Appl. No.: 155,155

[22] Filed: Feb. 11, 1988

[30] Foreign Application Priority Data

Feb. 18, 1987 [JP] Japan ............................ 62-23314[U]

[51] Int. Cl.⁴ ......................... F16C 1/10; G05G 11/00

[52] U.S. Cl. ..................................... 74/502.2; 74/489; 74/506

[58] Field of Search ....................... 74/502.2, 487, 488, 74/489, 108, 505, 506; 474/141, 177

[56] References Cited

U.S. PATENT DOCUMENTS 1,540,638 6/1925 Laughter ............................... 74/108
1,558,689 10/1925 McBride ............................... 74/108
2,723,570 11/1955 Herrmann ........................... 74/502.2
3,362,238 1/1968 Hayashi et al. ....................... 474/82
4,156,371 5/1979 Juy ....................................... 74/487
4,409,861 10/1983 Sakurai ................................. 74/506
4,437,357 3/1984 Ozaki et al. ......................... 74/502.2
4,461,189 7/1984 Rottenkolber et al. .............. 74/489

FOREIGN PATENT DOCUMENTS 2714525 10/1977 Fed. Rep. of Germany .
3607548 9/1986 Fed. Rep. of Germany .

*Primary Examiner*—Allan D. Herrmann
*Assistant Examiner*—Janice Chartoff
*Attorney, Agent, or Firm*—Stevens, Davis, Miller & Mosher

[57] ABSTRACT

A speed-change operating lever is provided for a bicycle derailleur and includes a winding portion for a control wire connected to the derailleur, an operating portion in continuation of one side of the boss and extending outwardly therefrom, and a retaining portion for retaining one end of the wire. The boss has a winding amount changing device for changing the amount of the control wire wound on the winding portion so as to alter the operating stroke of the lever to adapt it for use with different sprocket assemblies having different distances between sprockets.

6 Claims, 3 Drawing Sheets

SPEED-CHANGE OPERATING LEVER FOR A BICYCLE

FIELD OF THE INVENTION

The present invention relates to a speed-change operating lever for a bicycle, and more particularly, to a speed-change operating lever for operating a front or rear bicycle derailleur through a control wire so as to shift a driving chain for changing the bicycle speed.

BACKGROUND OF THE INVENTION

Generally, the above type of operating lever, as disclosed in Japanese Utility Model Laid-Open Gazette No. Sho 58-98,291, is provided with a boss having a winding portion for a control wire, an operating portion connected to one side of the winding portion, and a retaining portion retaining one end of the wire. The boss is supported at its central portion rotatably to a lever shaft of a fixing member fixed to the bicycle frame. The control wire is guided into a winding groove recessed in the outer periphery of the boss and drawn out therefrom to be connected at its other end to a front or rear derailleur. The operating portion is operated in swinging motion so as to wind up the wire onto the winding portion.

Also, the above speed-change operating lever is provided with a positioning mechanism comprising a positioning member having a plurality of engaging portions and an engaging member engageable with one of the engaging portions, such that the positioning mechanism maintains the speed-change operating position get by the lever or with a friction portion which has applied thereto a frictional resistance against rotation so as to maintain thereby the set speed-change position.

The conventional speed-change operating lever, however, has a constant winding amount of the control wire with respect to an operating stroke of the lever, thereby creating the following problem:

Where the operating lever is provided with a positioning mechanism and the winding portion at the lever has a constant outer diameter to thereby fix the wire winding amount, the engaging portions for setting the speed change stages are spaced from each other at a predetermined interval, whereby a stroke of the wire with respect to the operating stroke of the lever for each engaging portion is determined.

However, different multistage sprocket assemblies exist, so that, when the number of sprockets is changed from six to seven, in other words, when the number of sprockets exceeds a predetermined value, an axial interval between each sprocket becomes smaller.

Therefore, where the intervals between the respective sprockets change because the number of sprockets changes or for other reasons, the lever using the aforesaid positioning mechanism cannot be used with the speed change operating device. This is because, when such lever is applied to a multistage sprocket assembly having smaller intervals between the respective sprockets, an amount of movement of the derailleur operated by the operating lever stroke preset by the positioning device does not correspond to the different interval between the respective sprockets.

Where the operating lever is provided with a friction portion as described above, the operator can operate the lever to desirably decide the lever stroke, so that the above problem does not arise. However, when the speed-change operating lever is operated, there is an operation range easy to use by him, but when the interval between the respective sprockets changes, the operation range shifts, thereby creating a problem in that the speed change efficiency deteriorates.

Although the operation range is variable for the operator, the conventional lever has a preset range and the position of the operating portion with respect to the bicycle frame, whereby an optimum operation range for the operator and the speed change position with respect to the bicycle frame cannot be selected.

SUMMARY OF THE INVENTION

An object of the invention is to provide a speed-change operating lever which can advantageously change a winding amount of a control wire by a simple adjustment with respect to an operation stroke so as to be applicable to the speed change operating device even when the interval between the respective sprockets at the multistage sprocket assembly changes, and which can select an optimum operation range or the position of an operating portion.

The present invention is characterized in that the speed-change operating lever for a bicycle for operating a bicycle derailleur through a control wire has a boss which has (1) winding portion for the control wire which is connected to the derailleur, (2) an operating portion in continuation of the boss and extending radially outwardly thereof, and (3) a retaining portion for retaining one end of the wire, and a winding amount changing means is provided at the boss to adjust an outer diameter of the winding portion with respect to the center of the boss.

The winding amount changing means preferably uses a winding adjuster having a circular arc configuration, the adjuster being adapted to be detachably mounted to the winding portion.

The winding amount changing means is operated to adjust an outer diameter of the winding portion onto which the wire is wound in order to change a winding amount of the wire, thereby enabling a stroke of the wire to be increased or decreased with respect to the operating stroke for operating the operating portion. Accordingly, the speed change operating lever of the invention can be altered to correspond to different multistage sprocket assemblies having different sprocket constitutions. Also, the range of operation stroke and the position of the operating portion with respect to the bicycle frame can be changed with ease.

The above and further objects and novel features of the invention will be more fully apparent from the following detailed description when the same is read in connection with the accompanying drawings.

DETAILED DESCRIPTION OF THE INVENTION

Figure 5:
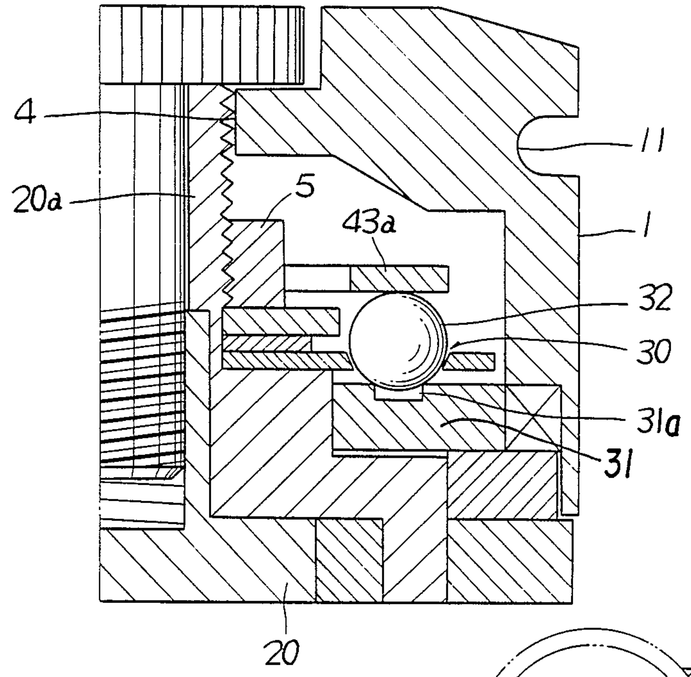
FIG. 5 is a partial sectional view exemplary of the speed-change operating lever, in which a positioning mechanism is incorporated.
Figure 6:
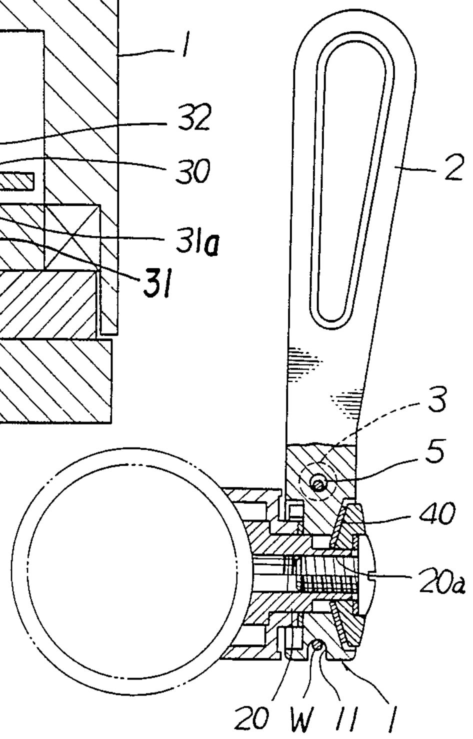
FIG. 6 is a partially cutaway front view of the lever of the invention in which a friction portion is incorporated.
Figure 7:
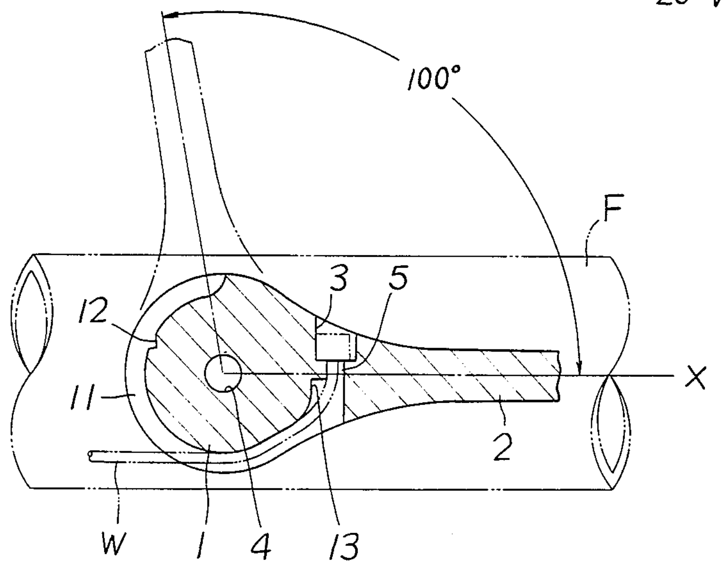
FIGS. 7 and 8 illustrate operation of the operating lever of the invention.

The speed-change operating lever of the present invention, as shown in FIGS. 5 and 6, is supported rotatably to a lever shaft 20*a* at a fixing member 20 fixed to the bicycle frame or a handle. The lever is provided with a boss 1 having a winding portion 11 for a control wire W connected to a derailleur, an operating portion 2 in continuation of the boss 1 and extending radially outwardly thereof, and a wire retaining portion 3 for retaining one end of the wire W. In use, an operator grips the operating portion 2 and swings it around the lever shaft 20*a* to wind up or draw the wire W onto or out from the winding portion 11 provided at the outer periphery of the boss 1. In addition, the boss 1 is provided at its center with a shaft bore 4 into which the lever shaft 20*a* is fitted. Retaining portion 3 and wire winding portion 11 communicate with each other through a communication bore 5.

In a first embodiment of the speed-change operating lever of the invention shown in FIGS. 1 through 4, the wire winding portion 11 is recessed to form a winding groove. The lever includes a semicircular winding adjuster 6 having a inner surface 61 having a circular arc shape and to be fitted into the winding groove and an outer surface 62 also having a circular arc shape for winding thereon the wire W. Adjuster 6 is detachably mounted to the winding portion 11, thereby forming a winding amount changing means.

Figure 4:
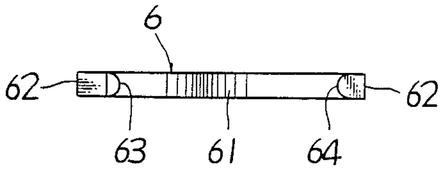
FIG. 4 is a plan view of the winding adjuster only.

The adjuster 6 is formed to be slightly smaller in width than the winding groove at the wire winding portion 11 in order to be fitted therein. The outer surface 62 of the adjuster 6, as shown in FIG. 4, is made flat, but may alternatively be recessed arcuately.

Figure 1:
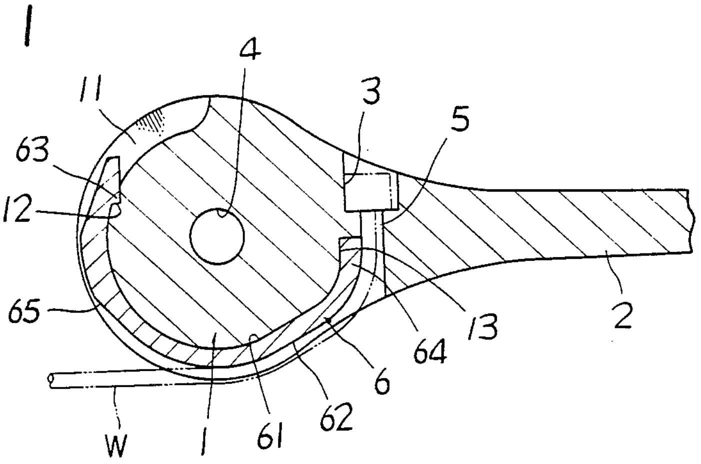
FIG. 1 is a longitudinal sectional view of a first embodiment of a speed-change operating lever of the invention.
Figure 2:
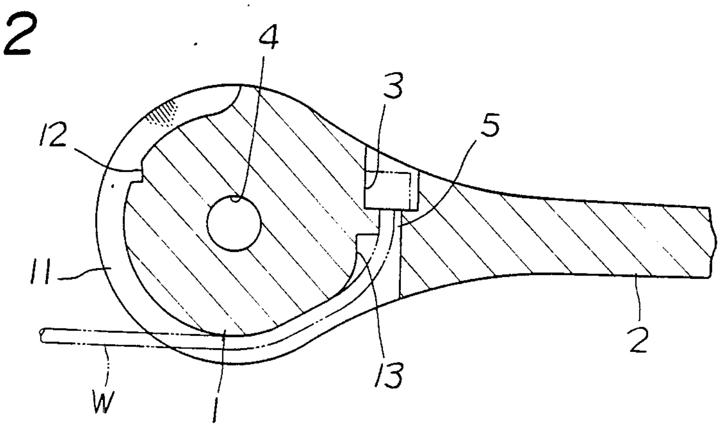
FIG. 2 is a longitudinal sectional view of the FIG. 1 embodiment, from which a winding adjuster is removed.
Figure 3:
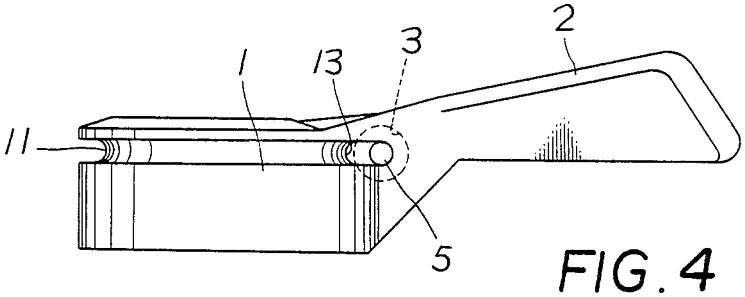
FIG. 3 is a bottom view of the FIG. 1 embodiment.

Referring to FIGS. 1 and 2, the wire winding portion 11 is provided at the bottom of the winding groove at the utmost end side thereof with a recessed retaining portion 12 and at the wire retaining portion 3 side with an engaging portion 13 formed through a curved portion having a smaller curvature than that of the winding groove. Adjuster 6 is provided at one end thereof with an engaging projection 63 engageable with the retaining portion 12 and at its other end with an urging portion 64 engageable with the engaging portion 13. Hence, the adjuster 6 is retained through the engaging projection 63 to the retaining portion 12 and somewhat elastically deformed to be urged through the urging portion 64 to the engaging portion 13, thereby being detachably mounted to the boss 1. Alternatively, the communication bore 5 may be made large enough to insert therein the adjuster 6, and a tubular retainer retained to the retaining portion 3 for the wire W may be provided at the end of adjuster 6, thereby mounting the adjuster 6 to the boss 1 through the tubular retainer, in which the mounting means is not particularly defined or limited to the described alternate embodiments.

Also, the adjuster 6 is provided at the fore end portion with a winding amount increasing portion 65 through which a wire winding amount of the wire W with respect to the speed-change operating stroke of the lever is larger than that at the root side of the adjuster 6, the winding amount increasing portion 65 providing a larger curvature at the fore end portion of adjuster 6 than the curvature at the root portion of adjuster 6.

Thus, even when a chain guide at the derailleur is required to be moved a larger amount axially of the multistage sprocket assembly at the top side more than at the low side with respect to the speed change operating stroke, the winding amount increasing portion 65 can move the chain guide by a predetermined amount in coincidence with the interval between the respective sprockets spaced axially of the multistage sprocket assembly.

The speed change operating lever, for example as shown in FIG. 5, is provided with a positioning mechanism 30 comprising a positioning member 31 having a plurality of engaging portions 31a for setting the speed change stages and an engaging member 32 selectively engageable with the engaging portions 31a, thereby maintaining the speed change operation position. Alternatively, as shown in FIG. 6, the lever can include a friction portion 40, whereby the speed change operation position is maintained by frictional resistance applied to the friction portion 40.

In an embodiment where a speed change operating lever which employs a positioning mechanism which sets, for example, seven-stage speed change operation positions is used together with a seven-stage speed changing sprocket assembly, the winding adjuster 6 is then removed from the lever in order to reduce the winding amount of the control wire W on the lever with respect to the speed change operating stroke of the lever in comparison with the larger stroke obtained when the adjuster 6 is attached thereto. When the lever is used together with a six-stage speed change sprocket assembly, the adjuster 6 is mounted onto the winding portion 11 as the boss 1 in order to increase the winding amount of the control wire W with respect to the lever stroke. In addition it is noted that, the multistage sprocket assembly is restricted with respect to the permissible interval between the smallest diameter sprocket and the largest diameter sprocket because the fork end at the bicycle frame is set in an interval of a predetermined length between the bifurcated legs. As a result, a seven-stage sprocket assembly has a relatively smaller interval between the respective sprockets than that of a six-stage sprocket assembly. Accordingly, the adjuster 6 is used to enable the speed change operating lever to be applied to both the seven-stage and six-stage speed change sprocket assemblies. In addition, when the radius of the wire winding portion 11 at the adjuster 6 is 9.3 mm, that of the fitting inner surface 61 of the same is 9.3 mm and that of the winding outer surface 62 is 10.8 mm.

Figure 8:
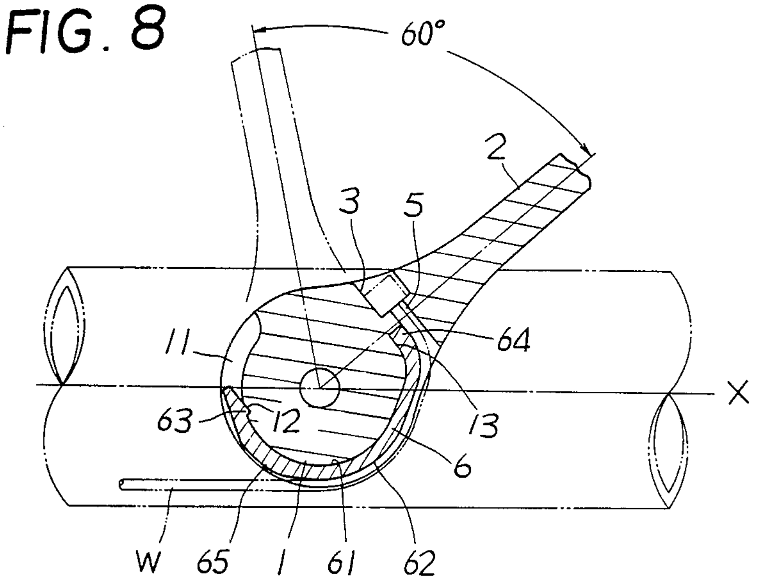

When the speed change operating lever is provided with the friction portion 40 a shown in FIG. 6, the speed change operating stroke required for speed change from the low stage to the top stage is usually set in a range of an angle of 100° with respect to the axis X of the bicycle frame F, the operating range being changeable by mounting the adjuster 6 at an angle of 60° as shown in FIG. 8. When the speed change operating stroke is intended to be, for example, 60°, or the top position of the operating portion 2 is intended to be spaced apart, for example, 40° from the axis X of the frame according to the choice of the operator, the adjuster 6 is mounted on the boss 1 to increase the winding amount of wire W with respect to the speed change operating stroke of the lever, thereby meeting the above requirement. In addition, in this case, when a radius of the winding portion 11 is 9.3 mm, that of the fitting inner surface 61 of the adjuster 6 is 9.3 mm and that of the winding outer surface 62 of the same is 16 mm.

Figure 9:
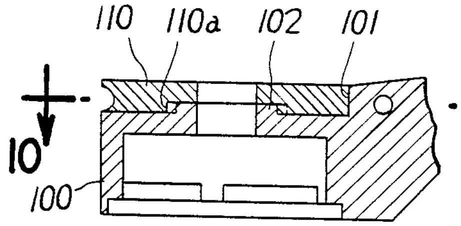
FIG. 9 is a sectional view of a principal portion only of a second embodiment of the speed-change operating lever of the invention.
Figure 10:
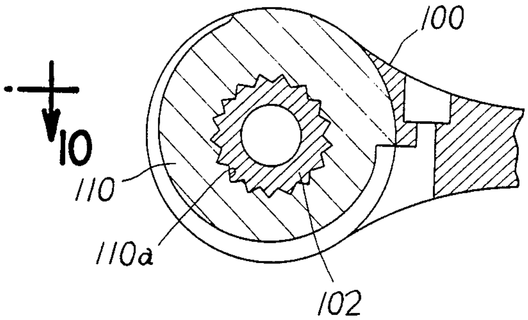
FIG. 10 is a sectional view taken on the line 10—10 in FIG. 9.

Alternatively, the winding amount changing means may be constructed as shown in FIGS. 9 and 10, in which a boss 100 is axially divided as shown in FIG. 9 to form a winding portion 110 having a winding groove independent of the boss 100. Winding portion 110, as shown in FIG. 10, is substantially disc-shaped, has at its center a coupling bore **110*a* having a polygonal inner periphery, and the radii at different circumferential portions of the outer periphery of the winding portion with respect to the bore 110a have different magnitudes. The boss 100 is provided with a socket 101 for receiving the winding portion 110 and at its center with a coupling projection 102 having a polygonal outer periphery coincident with and coupling with the polygonal inner periphery of the coupling bore 110*a*, the winding portion 110 being mounted to the boss 100** to be changeable in its circumferential coupling position.

Figure 11:
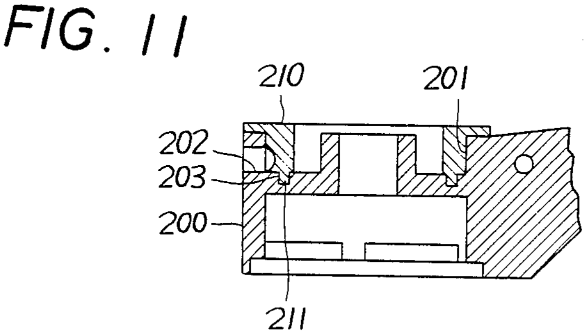
FIG. 11 is a sectional view of a principal portion only of a third embodiment of the speed-change operating lever of the invention.

Also, the winding amount changing means may alternatively be constructed in a third embodiment as shown in FIG. 11.

In FIG. 11, a boss 200 is separated from a winding portion 210 similarly to the second embodiment. Boss 200 is provided with an annular recess 201 receiving therein the winding portion 210 and with an opening 202 forming an elongate slot extending at a predetermined angle and for opening the recess 201 radially outwardly thereof. Also, a large number of pin bores 203 are provided at the bottom of the recess 201. Winding portion 210 is substantially ring-shaped, and the radii at different circumferential portions of the outer periphery of winding portion 210 have different magnitudes. Winding portion 210 has a plurality of pins 211 to be selectively fitted into the pin bores 203, whereby the winding portion 210 is mounted to the boss 200 to be changeable in the circumferential coupling positions.

Also, the winding amount changing means in the second embodiment may be provided with a plurality of winding portions having different radii so that the winding portions may be selectively mounted to the boss.

Although the invention has been described with reference to several different embodiments, these embodiments are merely exemplary and not limiting of the invention which is defined solely by the appended claims.

What is claimed is:

1. A speed-change operating lever for a bicycle for operating a derailleur through a control wire interconnecting the derailleur and the operating lever to change the bicycle speed, said lever comprising:

a boss provided with a winding portion for receiving said control wire, an operating portion in continuation of said boss and extending radially outwardly of said boss, and a wire retaining portion for retaining an end of said control wire, said winding portion being provided with a winding amount changing means for adjusting an outer diameter of said winding portion with respect to a center of said boss to change an amount by which said wire is wound at said winding portion, said winding amount changing means comprising a winding adjuster having a substantially circular arc shape and being detachably mounted on said winding portion and having a winding part on its outer side surface on which said wire is wound.

2. A speed-change operating lever for a bicycle according to claim 1, wherein said winding portion includes a winding groove formed in a circular arc configuration, and said winding adjuster includes an inner surface fitted into and conforming to said winding groove.

3. A speed-change operating lever for a bicycle according to claim 2, wherein said winding groove includes a recessed retaining portion recessed relative to a bottom portion of said winding groove and an engaging portion positioned on an opposite side of said boss relative to said retaining portion, said adjuster including an engaging projection engageable with said recessed retaining portion and an urging portion engageable with said engaging portion.

4. A speed-change operating lever for a bicycle according to claim 1, wherein said outer side surface of said adjuster has a varying curvature and includes a winding increasing portion at a larger curvature portion of said outer side surface.

5. A speed-change operating lever for a bicycle according to claim 1, wherein said winding portion is separate from said boss and is centered at a pivot shaft bore of said lever, and said winding portion has an outer periphery with radii having different magnitudes at different circumferential positions of said outer periphery, and said lever further comprising a mounting means interposed between said boss and said winding portion for mounting said winding portion to said boss in a plurality of selectively changeable angular positions.

6. A speed-change operating lever for a bicycle according to claim 1, wherein said winding portion is separate from said boss and is centered at a pivot shaft bore of said lever and comprises a plurality of winding members having different outer diameters, one of said winding members being detachably mounted on said boss.

* * * * *